United States Patent
Tanaka et al.

(10) Patent No.: US 11,417,471 B2
(45) Date of Patent: Aug. 16, 2022

(54) SOLID ELECTROLYTIC CAPACITOR AND PRODUCTION METHOD THEREOF

(71) Applicant: PANASONIC INTELLECTUAL PROPERTY MANAGEMENT CO., LTD., Osaka (JP)

(72) Inventors: Atsushi Tanaka, Osaka (JP); Kouta Muneyasu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 240 days.

(21) Appl. No.: 16/598,640

(22) Filed: Oct. 10, 2019

(65) Prior Publication Data

US 2020/0118765 A1  Apr. 16, 2020

(30) Foreign Application Priority Data

Oct. 12, 2018 (JP) .............................. JP2018-193370

(51) Int. Cl.
*H01G 9/00* (2006.01)
*H01G 9/15* (2006.01)
(Continued)

(52) U.S. Cl.
CPC ......... *H01G 9/0003* (2013.01); *H01G 9/0032* (2013.01); *H01G 9/055* (2013.01);
(Continued)

(58) Field of Classification Search
CPC .. H01G 9/0003; H01G 9/0029; H01G 9/0032; H01G 9/025; H01G 9/04;
(Continued)

(56) References Cited

U.S. PATENT DOCUMENTS 5,922,215 A * 7/1999 Pless .................... H01G 9/0029
216/6
8,038,738 B2 * 10/2011 Takahashi .............. H01G 9/012
29/25.03
(Continued)

FOREIGN PATENT DOCUMENTS

| CN | 108140493 A | 6/2018 |
| JP | 2000-208367 A | 7/2000 |

(Continued)

*Primary Examiner* — Nathan Milakovich
(74) *Attorney, Agent, or Firm* — McDermott Will & Emery LLP (57) ABSTRACT

Disclosed is a solid electrolytic capacitor 1 including capacitor elements 2A to 2C, an anode terminal 4, and a resin package body enclosing at least the capacitor elements, the capacitor elements 2A to 2C each including an anode body 6 having a porous portion as a surface layer, a dielectric layer 7, and a cathode part 8 covering at least part of the dielectric layer 7. The anode body 9 has a cathode forming portion and an anode thin-thickness portion adjacent to the cathode forming portion. The dielectric layer 7 covers at least part of a surface of the porous portion in the cathode forming portion. The porous portion is removed in the anode thin-thickness portion or is thinner in the anode thin-thickness portion than in the cathode forming portion. The anode body is connected to the anode terminal 4 at the anode thin-thickness portion.

15 Claims, 2 Drawing Sheets

(51) Int. Cl.
*H01G 9/055* (2006.01)
*H01G 9/26* (2006.01)
*H01G 9/08* (2006.01)

(52) U.S. Cl.
CPC ................. *H01G 9/08* (2013.01); *H01G 9/15* (2013.01); *H01G 9/26* (2013.01)

(58) Field of Classification Search
CPC .......... H01G 9/048; H01G 9/055; H01G 9/08; H01G 9/15; H01G 9/26
See application file for complete search history.

(56) References Cited

U.S. PATENT DOCUMENTS

| | | | |
|---|---|---|---|
| 2003/0007311 A1 | 1/2003 | Kojima et al. | |
| 2005/0013093 A1 | 1/2005 | Nagasawa et al. | |
| 2007/0030622 A1* | 2/2007 | Saida | H01G 9/012 361/272 |
| 2018/0233294 A1* | 8/2018 | Ishizaki | H01G 9/15 |
| 2020/0266005 A1* | 8/2020 | Suzuki | H01G 9/08 |
| 2022/0102081 A1* | 3/2022 | Hirota | H01G 9/025 |

FOREIGN PATENT DOCUMENTS

| | | |
|---|---|---|
| JP | 2003-007571 A | 1/2003 |
| JP | 2007-250920 A | 9/2007 |

\* cited by examiner

SOLID ELECTROLYTIC CAPACITOR AND PRODUCTION METHOD THEREOF

CROSS REFERENCE TO RELATED APPLICATION

The present application is based on and claims priority under 35 U.S.C. § 119 with respect to the Japanese Patent Application No. 2018-193370 filed on Oct. 12, 2018, of which entire content is incorporated herein by reference into the present application.

TECHNICAL FIELD

The present invention relates to a solid electrolytic capacitor and a production method of the solid electrolytic capacitor.

BACKGROUND

Electrolytic capacitors include a capacitor element, an electrode terminal electrically connected to the capacitor element, and a package body enclosing the capacitor element. The capacitor element includes a solid electrolyte layer provided in a cathode part. The solid electrolyte layer contains an electrically conductive polymer and is formed so as to cover at least part of a dielectric layer whose surface is roughened.

Patent Document 1 (JP2003-7571) discloses, in the step of forming a solid electrolyte layer, compressing a roughened layer by pressing, the roughened layer disposed between an anode leading part and a cathode part, or removing the roughened layer by shaving, to form an interdiction zone. The interdiction zone serves to prevent permeation of the conductive polymer along the roughened layer into the anode leading part.

In recent years, the use of solid electrolytic capacitors has been expanding, and their use in high-temperature environments has been promoted. Yet, the conventional solid electrolytic capacitors have been insufficient in reliability against thermal shock, when taking into account the use in high-temperature environments.

SUMMARY

One aspect of the present invention relates to a solid electrolytic capacitor including: a capacitor element including an anode body having a porous portion as a surface layer, a dielectric layer, and a cathode part covering at least part of the dielectric layer; an anode terminal; and a resin package body enclosing at least the capacitor element. The anode body has a cathode forming portion and an anode thin-thickness portion adjacent to the cathode forming portion. The dielectric layer covers at least part of a surface of the porous portion in the cathode forming portion. The porous portion is removed in the anode thin-thickness portion or is thinner in the anode thin-thickness portion than in the cathode forming portion. The anode body is connected to the anode terminal at the anode thin-thickness portion.

Another aspect of the present invention relates a production method of a solid electrolytic capacitor, the method including: a first step of preparing an anode body having a porous portion as a surface layer; a second step of forming a dielectric layer on at least part of the porous portion; a third step of partially compressing or removing the porous portion, to provide the anode body with an anode forming portion having a small thickness and a cathode forming portion having a thickness greater than the thickness of the anode forming portion; a fourth step of forming a cathode part on at least part of the dielectric layer, in the cathode forming portion; and a fifth step of cutting and removing a part of the anode forming portion, to form an anode thin-thickness portion including a remaining part of the anode forming portion, to obtain a capacitor element.

According to these aspects, a solid electrolytic capacitor excellent in thermal shock resistance can be realized.

DETAILED DESCRIPTION

A solid electrolytic capacitor according to an embodiment of the present invention includes a capacitor element, an anode terminal, and a resin package body enclosing at least the capacitor element. The capacitor element includes an anode body having a porous portion as a surface layer, a dielectric layer, and a cathode part covering at least part of the dielectric layer. In the capacitor element, the anode body has a cathode forming portion and an anode thin-thickness portion adjacent to the cathode forming portion, and the dielectric layer covers at least part of the surface of the porous portion in the cathode forming portion. Further, in the anode thin-thickness portion, the porous portion is removed, exposing a non-porous core member therefrom, or the porous portion is made thinner than in the cathode forming portion. The anode body is connected at the anode thin-thickness portion to the anode terminal.

Here, "the anode body is connected at the anode thin-thickness portion to the anode terminal" means that a connection area where the anode body is electrically connected to the anode terminal is formed in the anode thin-thickness portion. Electrical connection between the anode thin-thickness portion and the anode terminal can be achieved by, for example, bringing the anode thin-thickness portion into direct contact with the anode terminal, or as described later, by stacking the anode thin-thickness portions of a plurality of the capacitor elements with each other to form an anode stack, and then bringing the anode stack into contact with the anode terminal. That "the anode body is connected to the anode terminal at the anode thin-thickness portion" encompasses both cases.

The anode body typically has an anode part and a cathode forming portion. A dielectric layer may be formed so as to cover at least part of the porous portion in the cathode forming portion. A cathode part may be formed so as to cover at least part of the dielectric layer. The cathode part includes a solid electrolyte layer. The cathode part comprises, for example, a solid electrolyte layer covering at least part of the dielectric layer, and a cathode leading layer covering at least part of the solid electrolyte layer.

The anode thin-thickness portion provided adjacent to the cathode forming portion serves to prevent permeation of solid electrolyte into the anode side through the porous portion in the cathode forming portion, in the step of forming a solid electrolyte layer. The anode thin-thickness portion has, for example, a compressed layer formed by compressing the porous portion.

In one conventional configuration of the solid electrolytic capacitor, the anode thin-thickness portion is formed between the connection area to the anode terminal in the anode part (anode leading part) and the cathode forming portion. In this case, the capacitance of the solid electrolytic capacitor tends to decrease by repeated alternate exposure to high temperatures and low temperatures. An examination to search for a cause of the capacitance decrease found that a crack had occurred in the anode leading part (esp., in the vicinity of the boundary with the anode thin-thickness portion), and stress had concentrated at the cracked area. The examination revealed that, by being exposed to thermal shock, starting from the crack, the anode leading part had fatigue-fractured, which had led to a capacitance loss. It is to be noted that cracks are easily formed during pressing for forming the anode thin-thickness portion. In the case of removing the porous portion by shaving, too, cracks are easily formed by the load applied during machining. In either case, cracks tend to be formed at the boundary between a machined region and a non-machined region in the anode part.

To address this, in the solid electrolytic capacitor of the present embodiment, a region where the anode body is pressed is extended to a region of the anode leading part. Then, a part of the region thinned by pressing is cut and removed, and the remaining part of the thinned region is used as the anode thin-thickness portion. In this manner, an anode body in which the whole anode part including the anode leading region is the anode thin-thickness portion can be obtained. In this case, a portion where cracks are likely to be present within the region thinned by pressing is removed from the anode body, and almost no cracks are present in the remaining portion, i.e., the anode thin-thickness portion, on the anode leading part side. By connecting the anode thin-thickness portion including little or no cracks to the anode terminal, the fatigue fracture of the anode leading part starting from a crack can be reduced. Therefore, the occurrence of a decrease in capacitance due to thermal shock can be suppressed, and a highly reliable solid electrolytic capacitor against thermal shock can be realized.

The anode thin-thickness portion can be formed by compressing the porous portion of the anode body by pressing. The anode thin-thickness portion may be formed by removing at least partially the porous portion by, for example, shaving or laser machining. Alternatively, the anode thin-thickness portion may be formed by removing the porous portion entirely and exposing a core member.

In the case where the capacitor element is enclosed with a resin package body, the surface of the anode leading part and the anode terminal are usually both at least partially covered with the resin package body. In the contact areas of the anode leading part and the anode terminal where they are in contact with the resin package body, thermal stress tends to occur due to the difference in thermal expansion coefficient from the resin package body, and stress tends to concentrate due to thermal shock. Therefore, a decrease in capacitance due to thermal shock tends to become apparent. Whereas, in the solid electrolytic capacitor of the present embodiment, since there are almost no cracks in the anode thin-thickness portion, even when the surface of the anode thin-thickness portion and the anode terminal are both at least partially covered with the resin package body, the decrease in capacitance due to thermal shock can be suppressed.

Similarly, in the case where the anode part is bent or curved, since bending stress is constantly applied to the anode part, the capacitor element is prone to be affected by stress concentration due to thermal shock. Therefore, a decrease in capacitance due to thermal shock tends to become apparent. Whereas, in the solid electrolytic capacitor of the present embodiment, since there are almost no cracks in the anode thin-thickness portion, the decrease in capacitance due to thermal shock can be suppressed, even when the anode thin-thickness portion is bent or curved.

The anode thin-thickness portion may have a spacing portion adjacent to the cathode forming portion, and an anode leading portion spaced apart from the cathode forming portion by the spacing portion. An electrically insulating layer may be disposed on at least one principal surface of the spacing portion. The insulating layer is, for example, an electrically insulating tape. The insulating layer serves to prevent the solid electrolyte layer from being formed in the anode part, in a solid electrolyte layer formation step. The insulating layer is usually formed on both sides of the spacing portion. At least one of the insulating layers formed on both sides may be removed after the solid electrolyte layer is formed.

When the insulating layer is left unremoved, the thickness of the insulating layer may be either greater than, or equal to or smaller than the combined thickness of the solid electrolyte layer and the cathode leading layer (i.e., the thickness of the cathode part). In order to clearly separate the anode leading portion from the cathode part, the thickness of the insulating layer is preferably greater than the thickness of the cathode part.

The solid electrolytic capacitor may include a plurality of capacitor elements. In this case, the plurality of capacitor elements may be formed into an element stack. The element stack includes, for example, an anode stacked portion where the anode thin-thickness portions of the capacitor elements are stacked with each other, and a cathode stacked portion where the cathode parts of the capacitor elements are stacked with each other. The anode stacked portion is electrically connected to an anode terminal; the cathode stacked portion is electrically connected to a cathode terminal. Electrical connection between the anode stacked portion and the anode terminal can be achieved by, for example, joining the anode leading portions (anode thin-thickness portions) of the plurality of capacitor elements by welding or clamping, and then bringing the joined portion into contact with the anode terminal; or by, in the anode stacked portion, bundling the anode leading portions (anode thin-thickness portions) of the plurality of capacitor elements, with a certain gap between the portions, and then bringing the end faces of the anode leading portions into contact with the anode terminal. In either case, since the cathode part is not formed in the anode stacked portion, the thickness of the anode stacked portion to be in contact with the anode terminal tends to be smaller than the thickness of the cathode stacked portion.

When the anode stacked portion and the cathode stacked portion have different thicknesses, in at least one of the capacitor elements constituting the element stack, the anode part becomes inevitably bent or curved. Especially in the capacitor element located in the uppermost layer or the lowermost layer of the element stack, the anode part tends to be greatly bent or curved. As a result, as described above, stress concentration and a decrease in capacitance due to thermal shock tend to become apparent.

Furthermore, in the case where the insulating layer is present in the spacing portion, the element stack tends to bulge at the spacing portion when the insulating layer is thick. Especially when the thickness of the insulating layer is larger than the combined thickness of the solid electrolyte layer and the cathode leading layer, the bulging at the spacing portion becomes remarkable. Consequently, the anode part becomes bent or curved to a greater degree and subjected to a larger bending stress.

Whereas, in the solid electrolytic capacitor of the present embodiment, as described above, even when the anode thin-thickness portion is bent or curved, the decrease in capacitance due to thermal shock can be suppressed. The solid electrolytic capacitor of the present embodiment is particularly useful in a structure including an element stack of a plurality of capacitor elements.

In view of reducing the degree of bending or curving of the anode part and suppressing the stress concentration due to thermal shock, it is preferable to remove at least one of the two insulating layers formed on both sides of the spacing portion. Specifically, in the solid electrolytic capacitor, in the capacitor elements constituting the element stack, the insulating layer may be disposed only on one of the first and second principal surfaces of the spacing portion. In this case, the capacitor elements may be stacked such that, in two of the capacitor elements stacked next to each other, the first principal surface of one capacitor element faces the second principal surface of the other capacitor element, with one insulating layer therebetween. Note that, of the capacitor elements constituting the element stack, some may have the insulating layer on both of the first and second principal surfaces.

Figure 1:
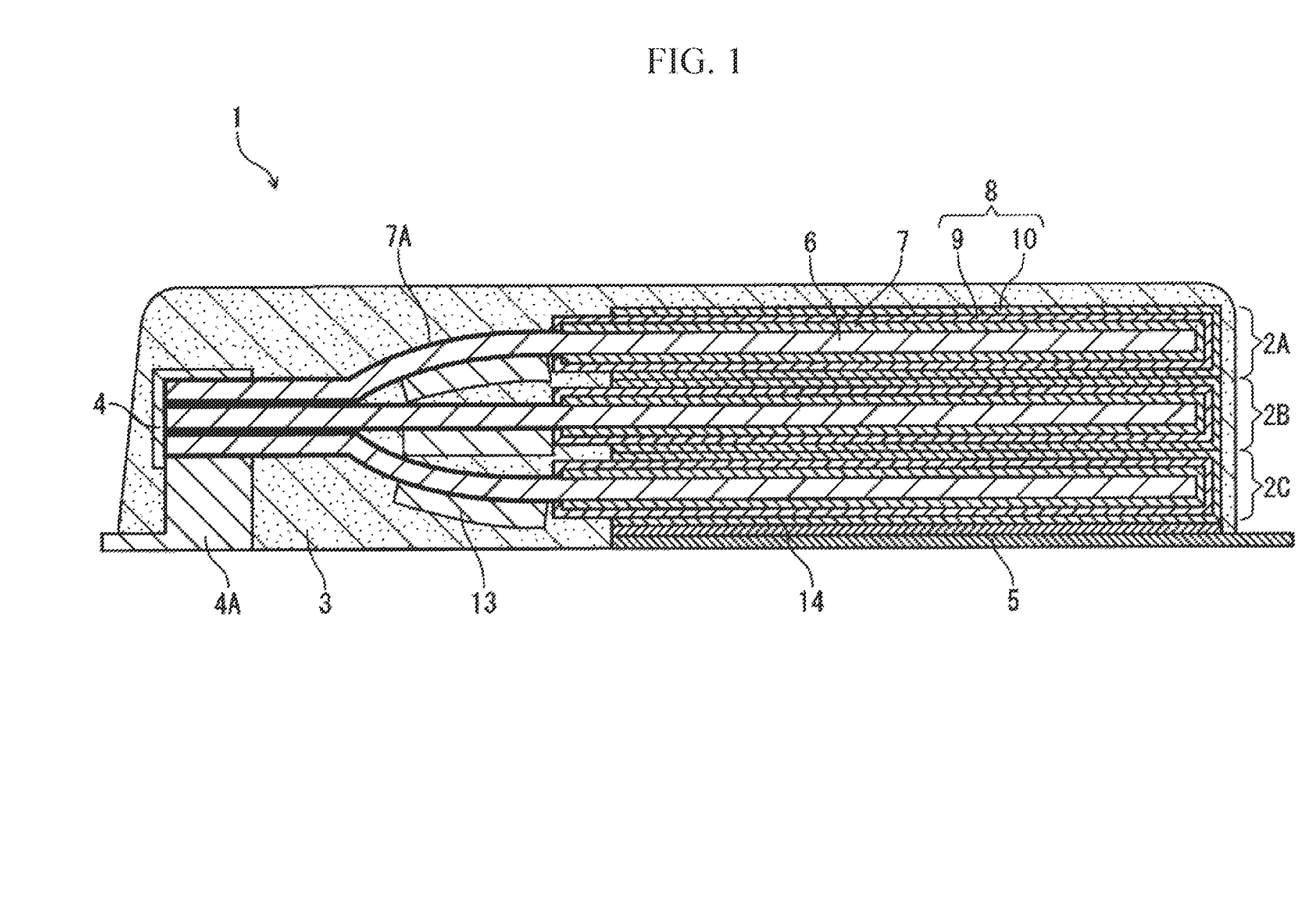
FIG. 1 is a schematic cross-sectional view of a solid electrolytic capacitor according to an embodiment of the present invention.
Figure 2:
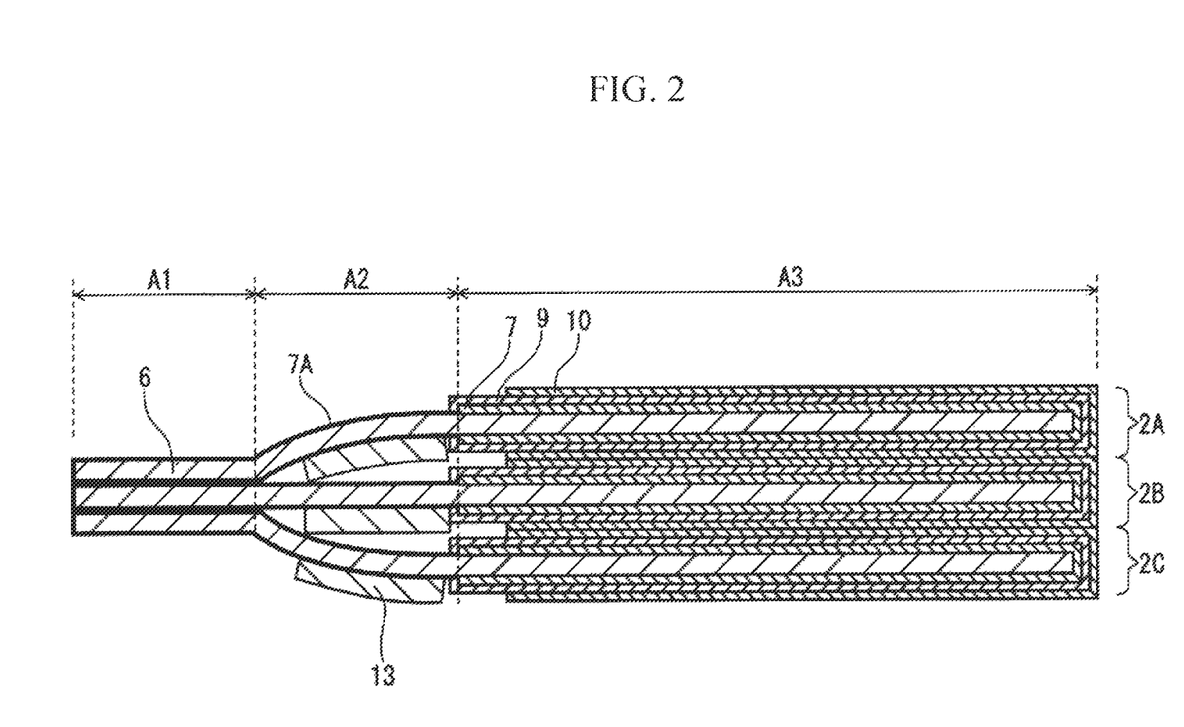
FIG. 2 is a schematic cross-sectional view of an exemplary capacitor element included in the solid electrolytic capacitor of FIG. 1.

FIG. 1 is a schematic cross-sectional view of a solid electrolytic capacitor according to an embodiment of the present invention. FIG. 2 is a schematic cross-sectional view of a capacitor element included in the solid electrolytic capacitor.

In the illustrated example, a solid electrolytic capacitor 1 includes a plurality of capacitor elements 2A to 2C. The solid electrolytic capacitor 1 further includes a package body (specifically, resin package body) 3 enclosing the capacitor elements 2A to 2C, an anode terminal 4, and a cathode terminal 5. The package body 3 has a substantially rectangular parallelepiped outer shape; the solid electrolytic capacitor 1 also has a substantially rectangular parallelepiped outer shape.

The capacitor elements 2A to 2C each include an anode body 6, a dielectric layer 7, and a cathode part 8 covering the dielectric layer 7. The anode body 6 has a core member and a porous portion. The capacitor elements 2A to 2C are stacked with each other, with an electrically conductive adhesive (not shown) interposed between the cathode parts, forming an element stack.

The anode body 6 has a region where the dielectric layer 7 is formed on the porous portion (cathode forming portion), and a region adjacent to the cathode forming portion where the porous portion is made thinner than in the cathode forming portion (anode thin-thickness portion). In the illustrated example, the porous portion formed into a thin film by pressing is shown as a compressed layer 7A. The portion where the compressed layer 7A is formed is the anode thin-thickness portion. The anode thin-thickness portion is defined into a spacing portion adjacent to the cathode forming portion, and an anode leading portion. Connection with the anode terminal 4 is made at the anode leading portion. In the spacing portion, an electrically insulating layer 13 is formed so as to cover, in a band shape, the surface of the anode body 6, restricting the contact between the cathode part 8 and the anode leading portion.

In the cathode forming portion, the cathode part 8 includes a solid electrolyte layer 9 covering at least part of the dielectric layer 7, and a cathode leading layer 10 covering at least part of the solid electrolyte layer 9. The cathode leading layer 10 is, for example, a laminate of a carbon layer and an electrically conductive paste layer. In the illustrated example, no distinction is made between the porous portion and the dielectric layer.

As illustrated in FIG. 2, the capacitor elements 2A to 2C are defined by the difference in stacking structure into three regions: an anode leading region A1, a spacing region A2, and a cathode forming region A3. A portion of the anode body 6 belonging to the anode leading region A1 corresponds to the above-mentioned anode leading portion. Likewise, a portion of the anode body 6 belonging to the spacing region A2 and a portion of the anode body 6 belonging to the cathode forming region A3 correspond to the above-mentioned spacing portion and the cathode forming portion, respectively.

In the anode leading region A1, the anode leading portions of the capacitor elements 2A to 2C are stacked with each other, forming an anode stacked portion of the element stack. To the anode stacked portion, the anode terminal 4 having an external terminal 4A bent into a predetermined shape is electrically connected. The external terminal 4A is a part of the anode terminal 4. The external terminal 4A may be an integral member with the remaining part of the anode terminal 4, or may be a separate member. On the other hand, in the cathode forming region A3, the cathode leading layers 10 of the capacitor elements 2A to 2C are stacked with each other, forming a cathode stacked portion of the element stack. To the cathode stacked portion, the cathode terminal 5 is electrically connected via an adhesive layer 14 formed of an electrically conductive adhesive. The outer surface of the cathode terminal 5 serves as an external terminal.

The element stack is enclosed by the package body 3, with the external terminal 4A being a part of the anode terminal 4 and the cathode terminal 5 both at least partially exposed from the package body 3.

In the spacing region A2, the insulating layer 13 is provided on one side of the spacing portion of the anode body 6 being the anode thin-thickness portion. The spacing portions are overlapped with each other, with the insulating layer 13 interposed therebetween, and the anode-leading portions are overlapped with each other for connection to the anode terminal 4. As such, in the spacing region A2, the capacitor element 2A at the uppermost layer and the capacitor element 2C at the lowermost layer are curved in the spacing portion, and bent near the boundary with the anode leading portions. The degree of bending is particularly large at the boundary with the anode leading portions. Therefore, the anode leading portions of the capacitor elements 2A and 2C, which are subjected to bending stress, are under the conditions where, if there is a crack, stress due to thermal shock tends to concentrate thereto, causing fatigue fracture.

Whereas, in the solid electrolytic capacitor 1, since both the anode leading portions and the spacing portions of the anode body 6 are the anode thin-thickness portions, almost no cracks are present in the anode leading portions and the spacing portions from the beginning. Therefore, even if thermal shock is applied, fatigue fracture of the anode leading portions is unlikely to occur. The solid electrolytic capacitor 1 therefore shows little decrease in capacitance due to thermal shock and has high reliability against thermal shock.

A detailed description will be given below of the configuration of the solid electrolytic capacitor.

(Package Body 3)

The package body 3 is for enclosing the capacitor element. In view of preventing the entry of air into the capacitor element, it is desirable that the package body 3 partially encloses both the anode terminal 4 and the cathode terminal 5. A resin package body can be formed by enclosing the capacitor element, together with part of the anode terminal 4 and part of the cathode terminal 5, with a resin material.

The resin package body preferably includes a cured product of a curable resin composition, and may include a thermoplastic resin or a composition containing a thermoplastic resin. Examples of the resin material constituting the case include a thermoplastic resin or a composition containing a thermoplastic resin.

The resin package body can be formed by using a molding technique, such as injection molding, insert molding, or compression molding. The resin package body can be formed by, for example, using a predetermined die, filling a curable resin composition or a thermoplastic resin (composition) into a predetermined place of the die, so as to cover the capacitor element, together with one ends of the anode terminal 4 and the cathode terminal 5. In the case of using a stack of the capacitor elements 2A to 2C, the resin package body is formed so as to cover the stack, together with parts of the anode terminal 4 and the cathode terminal 5.

The curable resin composition may include, in addition to the curable resin, a filler, a curing agent, a polymerization initiator, and/or a catalyst. Examples of the curable resin include epoxy resin, phenolic resin, urea resin, polyimide, polyamide imide, polyurethane, diallyl phthalate, and unsaturated polyester. The curable resin composition may contain two or more kinds of curable resin.

The filler is, for example, preferably electrically insulating particles (inorganic, organic) and/or fibers. Examples of an electrically insulating material constituting the filler include: an electrically insulating compound (e.g., oxide), such as silica or alumina; glass; and a mineral material (e.g., talc, mica, clay). The package resin may contain one kind or two or more kinds of these fillers. The content of the filler in the package resin is, for example, 10 to 90 mass %.

Examples of the thermoplastic resin include polyphenylene sulfide (PPS) and polybutylene terephthalate (PBT). A composition containing a thermoplastic resin may contain, for example, a filler as mentioned above, in addition to the thermoplastic resin.

(Anode Terminal 4, Cathode Terminal 5)

The anode terminal 4 and the cathode terminal 5 are electrically connected, each at its one end, to the capacitor element, and the other ends thereof are extended outside the package body 3. In the solid electrolytic capacitor 1, one end of the anode terminal 4 and one end of the cathode terminal 5 are covered with the package body 3, together with the capacitor elements 2A to 2C. The anode terminal 4 and the cathode terminal 5 may be, for example, a so-called lead frame. Examples of the material of the anode terminal 4 and the cathode terminal 5 include: a metal, such as copper; and an alloy thereof.

(Capacitor Elements 2A to 2C)

The capacitor elements 2A to 2C each include the anode body 6 forming the anode part, the dielectric layer 7, and the cathode part 8 including the solid electrolyte layer 9. The cathode part 8 includes at least the solid electrolyte layer 9. Preferably, the cathode part 8 includes the solid electrolyte layer 9 and the cathode leading layer 10 covering the solid electrolyte layer 9, as shown in FIGS. 1 and 2.

The electrolytic capacitor has at least one capacitor element. The electrolytic capacitor may have one capacitor element, or may have a plurality of the capacitor elements as in the electrolytic capacitor 1 illustrated in FIG. 1. The number of capacitor elements included in the electrolytic capacitor may be determined depending on the application.

(Anode Body 6)

The anode body 6 may contain, for example, a valve metal, an alloy containing a valve metal, a compound containing a valve metal. These materials can be used singly or in combination of two or more kinds. Preferable examples of the valve metal include aluminum, tantalum, niobium, and titanium. The porous portion of the anode body 6 can be obtained by, for example, roughening a surface of a base material (e.g., foil-like or plate-like base material) containing a valve metal, by etching or other methods.

The anode body 6 is thinned so that the occurrence of cracks can be prevented as much as possible in a portion other than the cathode forming portion on which the dielectric layer 7 is formed. The thinning can be carried out by applying a machining, such as pressing, shaving, or laser machining, to reduce the thickness of the porous portion or to remove the porous portion to expose the core member.

(Dielectric Layer 7)

The dielectric layer 7 can be formed by anodizing the valve metal at the surface of the anode body 6 by, for example, chemical treatment. The dielectric layer 7 may be formed so as to cover at least part of the anode body 6. The dielectric layer 7 is usually formed on the surface of the anode body 6. The dielectric layer 7 is formed on a porous surface of the anode body 6 and is formed along the inner walls of the pores or cavities (pits) of the surface of the anode body 6.

The dielectric layer 7 contains an oxide of a valve metal. For example, when the valve metal is tantalum, the dielectric layer contains $Ta_2O_5$; when the valve metal is aluminum, the dielectric layer contains $Al_2O_3$. The dielectric layer 7 is not limited thereto, and may be any layer as long as it functions as a dielectric. When the surface of the anode body 6 is porous, the dielectric layer 7 is formed along the surface (including the inner wall surface of the pores) of the anode body 6.

(Cathode Part 8, Solid Electrolyte Layer 9)

The solid electrolyte layer 9 included in the cathode part 8 contains an electrically conductive polymer, and may further include a dopant, an additive, or the like, if necessary. Examples of the conductive polymer include polypyrrole, polythiophene, polyaniline, and derivatives thereof. The solid electrolyte layer 9 can be formed by, for example, chemically polymerizing and/or electrolytically polymerizing a raw material monomer on the dielectric layer 7. Alternatively, it can be formed by bringing a solution or dispersion of the conductive polymer into contact with the dielectric layer 7. The solid electrolyte layer 9 is formed so as to cover at least part of the dielectric layer 7.

(Cathode Leading Layer 10)

The cathode leading layer 10 included in the cathode part 8 can be formed of, for example, a laminate of a carbon layer and an electrically conductive paste layer. The carbon layer has no limitation as long as it is electrically conductive, and can be formed using, for example, an electrically conductive carbon material, such as graphite. The conductive paste layer can be formed of, for example, a composition containing metal particles and a binder resin (e.g., epoxy resin). The metal particles are, for example, silver particles. The cathode leading layer 10 is not limited thereto, and may have any configuration as long as it has a current collecting function. The cathode leading layer 10 is formed so as to cover at least part of the solid electrolyte layer 9.

[Production Method of Solid Electrolytic Capacitor]

The aforementioned solid electrolytic capacitor can be produced by a method including the steps of: preparing an anode body having a porous portion as a surface layer (first step); forming a dielectric layer on at least part of the porous portion (second step); partially compressing or removing the porous portion, to provide the anode body with an anode forming portion having a small thickness and a cathode forming portion having a thickness greater than the thickness of the anode forming portion (third step); forming a cathode part on at least part of the dielectric layer, in the cathode forming portion (fourth step); and cutting and removing a part of the anode forming portion, to form an anode thin-thickness portion including a remaining part of the anode forming portion, to obtain a capacitor element (fifth step).

A detailed description will be given below of each step.

(First Step)

In this process, an anode body having a porous portion as a surface layer is prepared by a known method, according to the type of the anode body 6.

The anode body can be prepared by, for example, roughening a surface of a foil-like or plate-like base material containing a valve metal. The roughening may be carried out by any method as long as roughness can be formed on the surface of the base material. Examples of the method include etching (e.g., electrolytically etching) of the surface of the base material.

(Second Step)

Next, a dielectric layer is formed on at least part of the porous portion. The dielectric layer is formed by anodizing a surface of the anode body. The anodization may be performed by any known method, for example, by a chemical treatment. The chemical treatment can be performed by, for example, immersing the anode body in a chemical treatment solution to impregnate the anode body with the chemical treatment solution, and applying a voltage across the anode body, which is taken as an anode, and a cathode immersed in the chemical treatment solution. The chemical treatment solution is preferably, for example, a phosphoric acid aqueous solution.

The formation of the dielectric layer may be carried out on the anode body before a below-described third step, with the porous portion not yet thinned, or on the cathode forming portion after the third step.

(Third Step)

Next, the porous portion of the anode body is partially compressed or removed, to provide the anode body with a portion having a small thickness, the portion serving as an anode forming portion. On the other hand, the remaining part left uncompressed or unremoved of the anode body includes a region where a cathode part is to be formed in the fourth step (cathode forming portion).

The compression of the porous portion can be carried out by pressing the anode forming portion. Alternatively, the porous portion of the anode forming portion may be removed by shaving, thereby to reduce the thickness of the porous portion in the anode-forming portion. In this process, due to the load during machining, cracks may possibly occur on the surface of the anode forming portion (esp., at the boundary between the machined region and the non-machined region).

(Fourth Step)

Next, a cathode part is formed on at least part of the dielectric layer in the cathode forming portion. The cathode part includes a solid electrolyte layer. In this step, for example, a solid electrolyte layer is formed so as to cover at least part of the dielectric layer, and a cathode leading layer is formed so as to cover at least part of the solid electrolyte layer.

When the solid electrolyte layer contains an electrically conductive polymer, the solid electrolyte layer may be formed by, for example, depositing a processing solution containing an electrically conductive polymer, followed by drying. The processing solution may further contain other components, such as a dopant. The conductive polymer may be, for example, poly(3,4-ethylenedioxythiophene) (PEDOT). The dopant may be, for example, polystyrene sulfonic acid (PSS). The processing solution is a dispersion or solution of the conductive polymer. Examples of a dispersion medium (solvent) include water, an organic solvent, and a mixture thereof.

The solid electrolyte layer containing the conductive polymer may be formed alternatively by, for example, impregnation with monomers or oligomers into porous layer, followed by chemical polymerization or electrolytic polymerization.

Subsequently, a carbon paste and then an electrically conductive paste are applied on at least part of the surface of the formed solid electrolyte layer, whereby a cathode leading layer composed of the carbon layer and the conductive paste layer can be formed. The cathode leading layer is not limited thereto, and may have any configuration as long as it has a current collecting function.

(Fifth Step)

Next, a part of the thinned anode forming portion is cut and removed. This removes a part possibly including cracks from the anode forming portion. On the other hand, there are almost no cracks in the anode thin-thickness portion, i.e., the remaining part of the anode forming portion. This results in a capacitor element in which almost no cracks are present in the anode-leading portion.

Thereafter, if necessary, a plurality of the capacitor elements may be used to form an element stack in which the cathode parts are stacked. The anode leading portion of the capacitor element or the element stack is electrically connected to an anode terminal; the cathode leading layer of the capacitor element or the element stack is electrically connected to a cathode terminal. The capacitor element or the element stack is then covered with a resin package body, to enclose the capacitor element or the element stack therewith. In this way, a solid electrolytic capacitor can be produced.

After the third step (thinning of the anode forming portion) and before the fourth step (forming of a cathode part), a step of forming an electrically insulating layer on both sides of the anode forming portion may be performed. The insulating layer is for preventing formation of a solid electrolyte in the anode forming portion in the fourth step. The insulating layer is provided in a region near the cathode forming portion in the anode forming portion. In this case, within the anode forming portion, a region with no electrically-insulating layer serves as an anode leading portion. The anode leading portion is separated from the cathode part by the insulating layer.

After the fourth step and before the fifth step, the insulating layer may be removed from at least one side of the anode forming portion.

The insulating layer may be formed by applying a liquid-state insulating material containing an electrically insulating resin to a predetermined position, or by adhering a tape-shaped insulating material containing an electrically insulating resin (electrically insulating tape) to a predetermined position. The insulating layer is preferably formed of an electrically insulating tape. In this case, the insulating layer can be formed easily, and the insulating tape can be easily removed from at least one principal surface by peeling, after the solid electrolyte layer is formed.

In the case of forming an element stack in which the cathode parts of a plurality of capacitor elements are stacked, the capacitor elements may be stacked with each other, with one of the insulating layers on both sides of each anode forming portion being removed, while the other insulating layer being left unremoved. In forming an element stack, a plurality of capacitor elements are stacked such that, in two of the capacitor elements stacked next to each other, the side with the insulating layer present thereon (first principal surface) of one capacitor element faces the side with the insulating layer removed therefrom (second principal surface) of the other capacitor element. This results in a configuration in which, for example, as shown in FIG. 1, the first principal surface of one of two capacitor elements stacked next to each other faces the second principal surface of the other capacitor element, with one layer of the insulating layer interposed therebetween.

EXAMPLES

The present invention will be specifically described below with reference to Examples and Comparative Examples. The present invention, however, is not limited to the following Examples.

Example 1

A solid electrolytic capacitor 1 was fabricated and evaluated for its properties, in the manner as described below.
(1) Production of Capacitor Element An aluminum foil (thickness: 100 μm) was prepared as a base material. The entire surface of the aluminum foil was etched, to obtain an anode body. The anode body was immersed in a 0.3 mass % phosphoric acid solution (liquid temperature: 70° C.), and applied with a DC voltage of 70 V for 20 minutes. A dielectric layer containing aluminum oxide ($Al_2O_3$) was thus formed on part of the surface of the anode body.

Subsequently, a predetermined region of the anode body (i.e., anode forming portion) was thinned by pressing. In the anode forming portion, an electrically insulating resist tape was attached on both sides of a portion near the dielectric layer.

Thereafter, the anode body with the dielectric layer formed thereon was immersed in an aqueous dispersion (concentration: 2 mass %) of poly(3,4-ethylenedioxythiophene) (PEDOT) doped with polystyrene sulfonic acid (PSS), and then dried, to form a solid electrolyte layer.

A dispersion of carbon particles dispersed in water was applied onto the solid electrolyte layer, and then dried, to form a carbon layer on the surface of the solid electrolyte layer. Next, a silver paste containing silver particles and a binder resin (epoxy resin) was applied to the surface of the carbon layer, and then heated to cure the binder resin, to form an electrically conductive paste layer. In this manner, a cathode leading layer composed of the carbon layer and the conductive paste layer was formed.

Lastly, a part of the anode forming region was cut and removed.

In this manner, a capacitor element was obtained.
(2) Fabrication of Solid Electrolytic Capacitor Six capacitor elements obtained as above were stacked together by overlapping the cathode leading layers with each other, to form an element stack. The anode leading portions of the six capacitor elements were connected to an anode terminal, and the lowermost cathode leading layer was connected to a cathode terminal via an adhesive layer. Lastly, a package body was formed using a resin containing silica particles as a filler, to enclose the capacitor elements.

In this manner, a solid electrolytic capacitor was fabricated.

Comparative Example 1

In the fabrication of the capacitor element, a region to be thinned by pressing was changed. The width of the region to be pressed was narrowed so that only a portion of the anode body onto which the insulating resist tape was to be attached was thinned.

After the cathode leading layer was formed, the anode body was cut in a region left not-thinned, to obtain a capacitor element.

A solid electrolytic capacitor was obtained in the same manner as in Example 1, except for the above.

In Comparative Example 1, the connection area to the anode terminal in the anode leading portion was not thinned by pressing, and the boundary between the pressed and non-pressed regions was present between the insulating resist tape attached-portion and the anode leading portion.

The solid electrolytic capacitors of Example and Comparative Example fabricated above were evaluated as follows.
[Evaluation]

The solid electrolytic capacitors of Example 1 and Comparative Example 1 were each placed in a −55° C. environment for 30 minutes, and then placed in a 125° C. environment for 30 minutes. With this taken as one heat cycle, a −55° C./125° C. heat cycle was repeated 1500 cycles in total. After each heat cycle, the capacitance of each capacitor at 20° C. was measured.

In the solid electrolytic capacitor of Comparative Example 1, the capacitance decreased discontinuously after 800 heat cycles, showing a capacitance loss. On the other hand, the solid electrolytic capacitor of Example 1 showed no capacitance loss even after 1500 heat cycles.

The solid electrolytic capacitors having subjected to 1500 heat cycles were each cut along a plane parallel to the stacked direction of the element stack, to observe a cross-section photograph of the anode body at the anode leading portion. As a result, in the solid electrolytic capacitor of Comparative Example 1, in some of the capacitor elements, the anode leading portion was broken. On the other hand, in the solid electrolytic capacitor of Example 1, no breakage of the anode leading portion was observed.

The solid electrolytic capacitor according to the present invention shows excellent thermal shock resistance, and therefore is useful for various applications including use in high temperatures.

What is claimed is:
1. A solid electrolytic capacitor, comprising:
a capacitor element including an anode body having a porous portion as a surface layer, a dielectric layer, and a cathode part covering at least part of the dielectric layer;
an anode terminal; and
a resin package body enclosing at least the capacitor element,
the anode body having a cathode forming portion and an anode thin-thickness portion adjacent to the cathode forming portion, the dielectric layer covering at least part of a surface of the porous portion in the cathode forming portion, the porous portion being removed in the anode thin-thickness portion or being thinner in the anode thin-thickness portion than in the cathode forming portion, the anode body being connected to the anode terminal at the anode thin-thickness portion.

2. The solid electrolytic capacitor of claim 1, wherein the anode thin-thickness portion has a compressed layer formed by compressing the porous portion.

3. The solid electrolytic capacitor of claim 1, wherein a surface of the anode thin-thickness portion and the anode terminal are both at least partially covered with the resin package body.

4. The solid electrolytic capacitor of claim 1, wherein the anode thin-thickness portion is bent or curved.

5. The solid electrolytic capacitor of claim 1, wherein the anode thin-thickness portion has a spacing portion adjacent to the cathode forming portion, and an anode leading portion spaced apart from the cathode forming portion by the spacing portion, and an electrically insulating layer is disposed on at least one principal surface of the spacing portion.

6. The solid electrolytic capacitor of claim 5, wherein the cathode part includes a solid electrolyte layer covering at least part of the dielectric layer, and a cathode leading layer covering at least part of the solid electrolyte layer, and the electrically insulating layer has a thickness larger than a combined thickness of the solid electrolyte layer and the cathode leading layer.

7. The solid electrolytic capacitor of claim 5, comprising an element stack of a plurality of the capacitor elements, wherein in each of the plurality of the capacitor elements, the electrically insulating layer is disposed on either a first principal surface or a second principal surface of the spacing portion, and in two of the capacitor elements stacked next to each other, a first principal surface of one capacitor element faces a second principal surface of the other capacitor element, with one layer of the electrically insulating layer between the first principal surface and the second principal surface.

8. The solid electrolytic capacitor of claim 1, comprising an element stack of a plurality of the capacitor elements, wherein the element stack includes an anode stacked portion where the anode thin-thickness portions of the plurality of the capacitor elements are stacked with each other, and a cathode stacked portion where the cathode parts of the plurality of the capacitor elements are stacked with each other, and the anode stacked portion has, in an area in contact with the anode terminal, a thickness smaller than a thickness of the cathode stacked portion.

9. A production method of a solid electrolytic capacitor, the method comprising:

a first step of preparing an anode body having a porous portion as a surface layer;

a second step of forming a dielectric layer on at least part of the porous portion;

a third step of partially compressing or removing the porous portion, to provide the anode body with an anode forming portion having a small thickness and a cathode forming portion having a thickness greater than the thickness of the anode forming portion;

a fourth step of forming a cathode part on at least part of the dielectric layer, in the cathode forming portion; and a fifth step of cutting and removing a part of the anode forming portion, to form an anode thin-thickness portion including a remaining part of the anode forming portion, to obtain a capacitor element.

10. The production method of claim 9, further comprising steps of:

forming an electrically insulating layer on both sides of the anode forming portion, after the third step and before the fourth step; and removing the electrically insulating layer from at least one side of the anode forming portion, after the fourth step and before the fifth step.

11. The production method of claim 9, further comprising steps of:

forming an electrically insulating layer on both sides of the anode forming portion, after the third step and before the fourth step;

removing the electrically insulating layer from one side of the anode forming portion, after the fourth step and before the fifth step; and forming an element stack using a plurality of the capacitor elements, after the fifth step, the element stack including a plurality of the cathode parts stacked with each other, wherein in forming the element stack, the plurality of the capacitor elements are stacked such that, in two of the capacitor elements stacked next to each other, a side on which the electrically insulating layer is formed of one capacitor element faces a side from which the electrically insulating layer is removed of the other capacitor element.

12. The production method of claim 10, wherein the electrically insulating layer is an electrically insulating tape, and the step of removing the electrically insulating layer is a step of peeling off the electrically insulating tape from at least one side of the anode forming portion.

13. The production method of claim 11, wherein the electrically insulating layer is an electrically insulating tape, and the step of removing the electrically insulating layer is a step of peeling off the electrically insulating tape from one side of the anode forming portion.

14. The production method of claim 9, further comprising a step of covering the capacitor element with a resin package body.

15. The production method of claim 9, further comprising a step of electrically connecting the anode thin-thickness portion to an anode terminal at the anode thin-thickness portion, after the fifth step.

* * * * *